Figure 1:
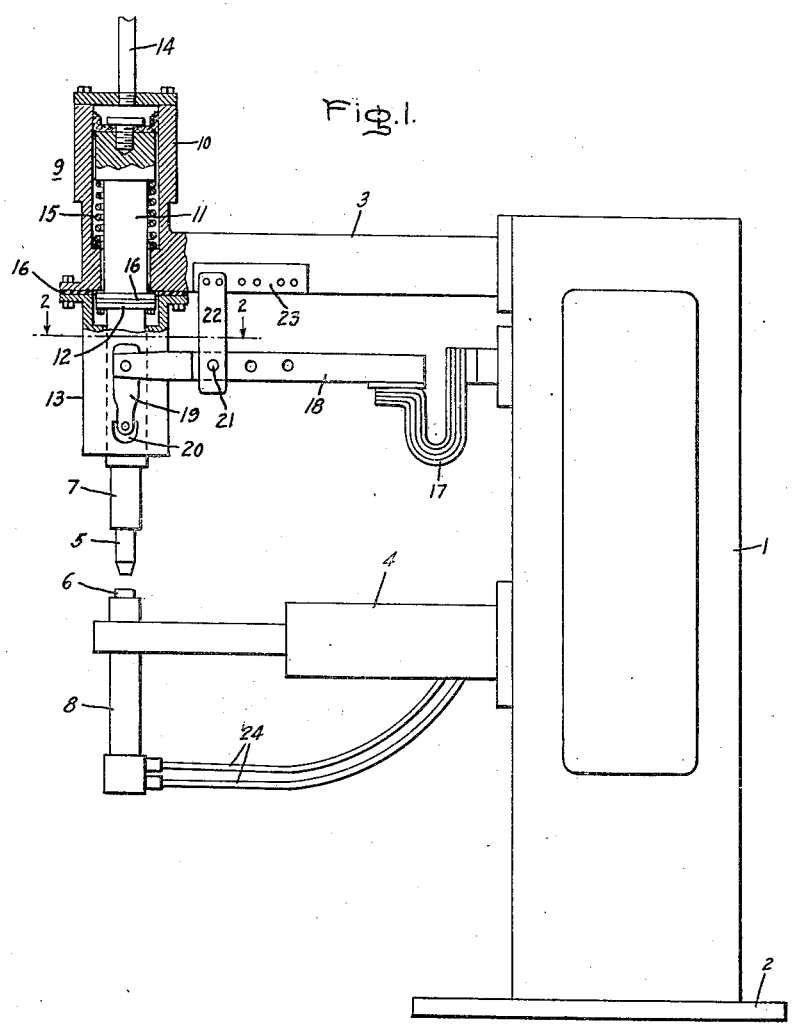

Oct. 9, 1945.    J. H. REDMOND    2,386,261

RESISTANCE WELDING APPARATUS

Filed Aug. 31, 1944

Inventor:
James H. Redmond,
by Harry E. Dunham
His Attorney.

Patented Oct. 9, 1945

2,386,261

UNITED STATES PATENT OFFICE 2,386,261

RESISTANCE WELDING APPARATUS

James H. Redmond, Schenectady, N. Y., assignor to General Electric Company, a corporation of New York Application August 31, 1944, Serial No. 552,026

8 Claims. (Cl. 219—4)

My invention relates to resistance welding apparatus.

I have determined that in certain welding machines the welding circuit conductors which connect the welding electrodes to the source of supply are so positioned relative to one another and supported in such manner on the frame of the welding machine that the electromagnetic force of repulsion on these conductors resulting from the flow of welding current therethrough acts on the welding electrodes in a manner to lift them from the work. This repulsive force consequently reduces the welding pressure applied to the work parts through the mechanical means provided therefor so that during welding the desired welding pressure is not obtained. This lack of desired welding pressure may be sufficient to cause sparking between the electrodes and the work and result in rapid deterioration of the electrodes and damage to the work parts engaged thereby. This condition is particularly objectionable when welding with high current values and relatively low electrode pressures as when fabricating assemblies made of aluminum, magnesium, copper, copper alloys and the like.

If the welding pressure is increased sufficiently to counteract this electromagnetic force of repulsion resulting from the flow of current in the welding circuit, it is frequently necessary to increase the flow of welding current but this in turn often increases this electromagnetic force to such an extent that the increased pressure does not of itself eliminate the difficulties encountered.

It is an object of my invention to provide resistance welding machines of improved construction in which the electromagnetic forces of repulsion existing in the welding circuit at the time of welding are employed for increasing or reinforcing the welding pressure applied to the electrodes by the mechanical means employed for this purpose.

It is a further object of my invention to provide electrical means including the welding circuit through the electrodes for controlling the electrode pressure on the work during the period of welding current flow.

It is also an object of my invention to include in the welding circuit of a resistance welding machine a lever pivotally supported on the frame of the machine with its pressure arm connected for controlling the pressure applied to the work through the electrodes and with its force arm located adjacent and lengthwise of another part of the welding circuit in which it is lengthwise connected so that the electromagnetic force of repulsion between this other part of the welding circuit and the force arm of this lever upon current flow therethrough moves the lever about its pivotal support in a direction to apply a controlling electrode pressure to the work.

In accordance with another object of my invention the lever arrangement described in the preceding paragraph is supported on the frame of the welding machine by a pivot connection adjustable lengthwise of the lever so that the electromagnetic force of repulsion exerted thereon may be suitably multiplied or otherwise controlled in order to exert the desired reinforcing electrode pressure on the work during the welding operation.

Figure 2:
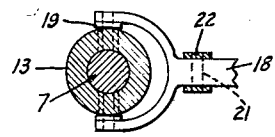

Further objects of my invention will become apparent from the following description of one embodiment thereof illustrated in the accompanying drawing, Fig. 1 of which is a side view of a resistance spot welding machine to which my invention has been applied and Fig. 2 of which is a sectional view taken along lines 2—2 of Fig. 1.

In the machine illustrated in the drawing, the electromagnetic force of repulsion acting on sections of the welding circuit is employed for applying a reinforcing electrode pressure to the work between the electrodes. This is accomplished through the agency of a lever which is pivotally supported on the frame of the welding machine and forms a movable lengthwise section of the welding circuit. This lever is positioned with its force arm adjacent another portion of the welding circuit and with its pressure arm suitably connected so that movement of the force arm of the lever produced by the repulsive electromagnetic force exerted thereon by the flow of welding current through the welding circuit applies the desired reinforcing electrode pressure to the electrodes. This lever forming a part of the welding circuit may be supported on the frame of the welding machine by a pivotal connection which is adjustable lengthwise of the lever so that the resulting electrode pressure obtained therefrom may be controlled in amount and in direction.

The resistance spot welding machine illustrated in Fig. 1 of the drawing comprises a frame 1 provided with a supporting base 2 and projecting arms 3 and 4 forming a throat for the reception of work parts. Welding current and pressure are applied to these work parts, not shown in the drawing, through cooperating electrodes 5 and 6 mounted in suitable holders 7 and 8 which are supported at the outer ends of arms 3 and 4 of the welding machine.

Electrodes 5 and 6 are moved toward and away from one another and welding pressure is applied to the work inserted between these electrodes through the agency of a fluid operated means 9 mounted on the outer end of the upper arm 3 of the welding machine. This fluid operated means comprises a cylinder 10 forming an integral part of arm 3 and its piston 11 which is connected to electrode holder 7 through a bolted, flanged joint 12. Electrode holder 7 is guided in its movement toward and away from the work parts by a cylindrical sleeve 13 bolted to the underside of cylinder 10.

Fluid pressure is admitted to and exhausted from the upper portion of cylinder 10 through a pipe 14, and piston 11 is biased to the upper part of cylinder 10 by means of a helical spring 15 located between a shouldered portion of piston 11 and the bottom inside wall of cylinder 10. Guide sleeve 13 and electrode holder 7 are electrically insulated from the frame of the welding machine by layers of suitable material 16.

Alternating welding current is supplied to electrodes 5 and 6 through their holders 7 and 8 by means of a welding circuit extending along opposite sides of the welding machine throat formed by projecting arms 3 and 4. The terminals of this welding circuit are connected to the electrodes and to the terminals of a welding transformer enclosed within frame 1 of the machine. The welding circuit from one terminal of this transformer to electrode 6 and its holder 8 is completed through lower arm 4 of the welding machine. The welding circuit from the other terminal of this welding transformer to electrode 5 and its holder 7 is completed through a flexible connection 17, a force multiplying lever 18, links 19 attached to the forked end of lever 18, and electrode holder 7. The connections between links 19 and electrode holder 7 extend through suitably shaped openings 20 in guide sleeve 13 for electrode holder 7 so that movement of lever 18 may transmit movement to electrode holder 7 and electrode 5 supported therein.

Lever 18 is mounted on a pivot pin 21 which is supported by the lower ends of two straps 22 whose upper ends are attached to supporting surfaces 23 on opposite sides of arm 3 of the machine. Lever 18 is suitably insulated from arm 3 of the welding machine by forming straps 22 of insulating material or by providing insulation between them and arm 3 along the surfaces of attachment 23 when these straps are formed of electrically conductive material. Pivot pin 21 may be moved lengthwise of lever 18 to any one of three selected positions, and straps 22 may be bolted to arm 3 in positions corresponding to these pivot pin positions. This arrangement provides, consequently, a pivot connection which is adjustable lengthwise of the lever.

It will be noted that the pressure arm of lever 18, which extends to the left of pivot pin 21, is connected for applying pressure to the work located between electrodes 5 and 6 through the agency of electrode holder 7 to which pressure is also applied by fluid operated means 9. It will also be noted that the force arm of this lever, which extends to the right of pivot pin 21, is located adjacent and lengthwise of that part of the welding circuit extending through arm 4 of the welding machine. Furthermore movement of lever 18 is permitted by reason of the flexible connection 17 so that the electromagnetic force of repulsion between the force arm of lever 18 and the lower arm 4 of the welding machine, forming respectively movable and rigid portions of the welding circuit, causes lever 18 to rotate in a counterclockwise direction about its pivot pin 21 and apply reinforcing electrode pressure to the work upon the flow of welding current in the welding circuit. This pressure is in the same direction and additional to that welding pressure exerted on the work by the fluid operated means 9. Consequently during each welding operation the flow of welding current will, by reason of the electromagnetic force of repulsion between parts of the welding circuit, cause an increase in the pressure exerted by the electrodes on the work. The amount of this increased pressure may be variously multiplied by shifting the pivotal connection between lever 18 and arm 3 of the welding machine to any one of the three positions provided. It is of course apparent that an adjustable position may be provided whereby the electromagnetic force of repulsion acting on lever 18 will decrease the electrode pressure by a predetermined amount during each welding operation.

In the machine illustrated in the drawing the lower electrode 6 and its holder 8 have been illustrated as artificially cooled by the circulation of a suitable coolant through conduits 24. It is of course apparent that the upper electrode 5 and its holder 7 may be artificially cooled in like manner.

Instead of the flexible connection 17 for connecting the end of lever 18 to a fixed portion of the welding circuit of which it forms a part, other arrangements may be employed. Thus for example a current conductive joint having relatively movable parts may be provided by a frictional or rolling connection between the end of lever 18 and an arcuate strip forming a part of the fixed portion of the welding circuit. Furthermore instead of completing the welding circuit through the pins connecting links 19 to the forked ends of lever 18 and to the electrode holder 7, a more direct electrically conductive connection may be made through one or more flexible conductors or their equivalents which would shunt the welding current about these pins individually or extend from the lever 18 directly to the electrode holder 7. It is also apparent that other means than the linkage illustrated may be employed for mechanically connecting the pressure arm of lever 18 to electrode holder 7.

Furthermore instead of the simple lever system illustrated in the drawing for utilizing the electromagnetic force of repulsion to apply additional electrode pressure to the work, compound lever systems may be employed. Furthermore the lever systems may be so constructed and positioned in the throat of the welding machine that the force arm of the lever is equal in length to the length of the lever. Arrangements may also be provided so that the pressure arm of the lever is connected to either or both of the electrodes or their holders.

It is of course apparent that my invention is not limited to any particular form of resistance welding since the principles thereof are equally applicable to all forms of resistance welding wherein pressure is exerted on the work through electrodes at the time of welding current flow therethrough. It is also apparent that my invention is not limited to resistance welding machines employing alternating current since the same principles are involved when using direct current or pulses of current such as obtained by the discharge of a condenser or the collapse of a magnetic field of an energy storage system of the inductive type.

These and other variations of my invention will occur to those skilled in the art. I aim, therefore, to cover by the appended claims all such modifications and variations as fall within the true spirit and scope of my invention.

What I claim as new and desire to secure by Letters Patent of the United States is:

1. Resistance welding apparatus comprising a frame, cooperating work engaging electrodes mounted on said frame, mechanical means on said frame for moving said electrodes toward and away from one another and for applying welding pressure through said electrodes to a work part therebetween, and electrical means including the welding circuit through said electrodes for controlling the electrode pressure on the work during the period of welding current flow through said electrodes, said means including a lever pivotally supported on said frame with its pressure arm connected for controlling the pressure applied to the work through said electrodes and with its force arm located adjacent and lengthwise of another part of said welding circuit in which it is lengthwise connected through a current conductive joint having relatively movable parts so that the electromagnetic force of repulsion between said other part of said welding circuit and said force arm of said lever upon current flow therethrough moves said lever about its pivotal support in a direction to apply said controlling electrode pressure to the work.

2. Resistance welding apparatus comprising a frame, cooperating work engaging electrodes mounted on said frame, mechanical means on said frame for moving said electrodes toward and away from one another and for applying welding pressure through said electrodes to a work part therebetween, and electrical means including the welding circuit through said electrodes for controlling the electrode pressure on the work during the period of welding current flow through said electrodes, said means including a lever supported on said frame by a pivot connection adjustable lengthwise of said lever with its pressure arm connected for controlling the pressure applied to the work through said electrodes and with its force arm located adjacent and lengthwise of another part of said welding circuit in which it is lengthwise connected through a current conductive joint having relatively movable parts so that the electromagnetic force of repulsion between said other part of said welding circuit and said force arm of said lever upon current flow therethrough moves said lever about its pivotal support in a direction to apply said controlling electrode pressure to the work.

3. Resistance welding apparatus comprising a frame, cooperating work engaging electrodes mounted on said frame, mechanical means on said frame for moving said electrodes toward and away from one another and for applying welding pressure through said electrodes to a work part therebetween, and electrical means including the welding circuit through said electrodes for reinforcing the electrode pressure on the work during the period of welding current flow through said electrodes, said means including a force multiplying lever pivotally supported on said frame with its pressure arm connected for applying additional pressure to the work through said electrodes and with its force arm located adjacent and lengthwise of another part of said welding circuit in which it is lengthwise connected through a current conductive joint having relatively movable parts so that the electromagnetic force of repulsion between said other part of said welding circuit and said force arm of said lever upon current flow therethrough moves said lever about its pivotal support in a direction to apply said reinforcing electrode pressure to the work.

4. Resistance welding apparatus comprising a frame, cooperating work engaging electrodes mounted on said frame, mechanical means on said frame for moving said electrodes toward and away from one another and for applying welding pressure through said electrodes to a work part therebetween, and electrical means including the welding circuit through said electrodes for reinforcing the electrode pressure on the work during the period of welding current flow through said electrodes, said means including a force multiplying lever supported on said frame by a pivot connection adjustable lengthwise of said lever with its pressure arm connected for applying additional pressure to the work through said electrodes and with its force arm located adjacent and lengthwise of another part of said welding circuit in which it is lengthwise connected through a current conductive joint having relatively movable parts so that the electromagnetic force of repulsion between said other part of said welding circuit and said force arm of said lever upon current flow therethrough moves said lever about its pivot connection in a direction to apply said reinforcing electrode pressure to the work.

5. Resistance welding apparatus comprising a frame having projecting arms forming a throat for the reception of a work part, work engaging electrodes mounted on the outer ends of said arms, means mounted on said frame for moving said electrodes toward and away from one another and for applying welding pressure through said electrodes to a work part located therebetween, a circuit for supplying welding current to said electrodes along opposite sides of said throat formed by said projecting arms of said frame, a current conducting lever forming a movable lengthwise section of said welding circuit, means for pivotally supporting said lever on one of said arms of said frame with its force arm adjacent a portion of said welding circuit extending along said other arm of said frame, and means for mechanically connecting the pressure arm of said lever for supplying a reinforcing pressure to the work through said electrodes in response to the movement of the force arm of said lever produced by the repulsive electromagnetic force exerted thereon by the flow of current through said welding circuit of which it forms a part.

6. Resistance welding apparatus comprising a frame having projection arms forming a throat for the reception of a work part, work engaging electrodes mounted on the outer ends of said arms, means mounted on said frame for moving said electrodes toward and away from one another and for applying welding pressure through said electrodes to a work part located therebetween, a circuit for supplying welding current to said electrodes along opposite sides of said throat formed by said projecting arms of said frame, a current conducting lever forming a movable lengthwise section of said welding circuit, means for pivotally supporting said lever on one of said arms of said frame with its force arm adjacent a portion of said welding circuit extending along said other arm of said frame, means for mechanically connecting the pressure arm of said lever for supplying a reinforcing pressure to the work through said electrodes in response to the movement of the force arm of said lever produced by the repulsive electromagnetic force exerted thereon by the flow of current through said welding circuit of which it forms a part, and means for adjusting lengthwise of said lever its pivotal support on said arm of said frame and thereby controlling the reinforcing electrode pressure exerted thereby.

7. Resistance welding apparatus comprising a frame having projecting arms forming a throat for the reception of a work part, cooperating electrodes, means for mounting one of said electrodes on the outer end of one of said arms of said frame, a holder for the other of said electrodes, fluid operated means on the outer end of said other arm of said frame for moving said electrode holder and said electrode therein toward and away from said cooperating electrode and for applying pressure through said electrodes to a work part therebetween, a circuit for supplying welding current to said electrodes along opposite sides of said throat formed by said projecting arms of said frame, a current conducting lever forming a movable part of said welding circuit and having one end electrically and mechanically connected with said electrode holder and its other end connected through a flexible conductor with another portion of said welding circuit mounted on said frame, and means for pivotally supporting said lever on said arm on which said fluid operated means is located with its force arm extending lengthwise of the welding circuit extending along said other arm of said frame so that the electromagnetic force of repulsion between said lever and that portion of the welding circuit along said other arm along which said lever extends operates said lever to move said electrodes toward one another upon the flow of welding current through said circuit and said electrodes.

8. Resistance welding apparatus comprising a frame having projecting arms forming a throat for the reception of a work part, cooperating electrodes, means for mounting one of said electrodes on the outer end of one of said arms of said frame, a holder for the other of said electrodes, fluid operated means on the outer end of said other arm of said frame for moving said electrode holder and said electrode therein toward and away from said cooperating electrode and for applying pressure through said electrodes to a work part therebetween, a circuit for supplying welding current to said electrodes along opposite sides of said throat formed by said projecting arms of said frame, a current conducting lever forming a movable part of said welding circuit and having one end electrically and mechanically connected with said electrode holder and its other end connected through a flexible conductor with another portion of said welding circuit mounted on said frame, means for pivotally supporting said lever on said arm on which said fluid operated means is located with its force arm extending lengthwise of the welding circuit extending along said other arm of said frame so that the electromagnetic force of repulsion between said lever and that portion of the welding circuit along said other arm along which said lever extends operates said lever to move said electrodes toward one another upon the flow of welding current through said circuit and said electrodes, and means for adjusting lengthwise of said lever its pivotal support on said arm of said frame and thereby controlling the reinforcing electrode pressure exerted thereby.

JAMES H. REDMOND.